United States Patent
Mosto (10) Patent No.: US 11,397,616 B2
(45) Date of Patent: Jul. 26, 2022

(54) SYSTEMS AND METHODS FOR COLLECTING AND SENDING REAL-TIME DATA

(71) Applicant: Hitachi Vantara, LLC, Santa Clara, CA (US)

(72) Inventor: David John Mosto, Dublin, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 17/626,712

(22) PCT Filed: Jul. 23, 2019

(86) PCT No.: PCT/US2019/043017
§ 371 (c)(1),
(2) Date: Jan. 12, 2022

(87) PCT Pub. No.: WO2021/015739
PCT Pub. Date: Jan. 8, 2021

(65) Prior Publication Data
US 2022/0206847 A1    Jun. 30, 2022

(51) Int. Cl.
*G06F 9/46* (2006.01)
*G06F 9/48* (2006.01)
*G06F 11/07* (2006.01)
*G06F 9/54* (2006.01)

(52) U.S. Cl.
CPC ............ *G06F 9/4881* (2013.01); *G06F 9/546* (2013.01); *G06F 11/0793* (2013.01); *G06F 2209/548* (2013.01)

(58) Field of Classification Search
CPC .... G06F 9/4881; G06F 9/546; G06F 11/0793; G06F 2209/548
See application file for complete search history.

(56) References Cited

U.S. PATENT DOCUMENTS

| | | |
|---|---|---|
| 2002/0133531 A1 | 9/2002 | Fukushima |
| 2006/0294058 A1 | 12/2006 | Zabback et al. |
| 2007/0214161 A1 | 9/2007 | Goyal et al. |

OTHER PUBLICATIONS

Maguire et al. "Find queues and messages in queues in the Exchange Management Shell." In: Microsoft. Jul. 9, 2018 (Jul. 9, 2018) Retrieved on Sep. 20, 2019 (Sep. 20, 2019) from <https://docs.microsoft.com/en-us/exchange/mail-flow/queues/queues-and-messages-in-powers hell?view=exchserver-2019>, 16 total pages.

(Continued)

*Primary Examiner* — Wissam Rashid
(74) *Attorney, Agent, or Firm* — Procopio, Cory & Hargreaves & Savitch LLP (57) ABSTRACT

Example implementations described herein involve a system that manages a dispatch of data within an Internet of Things (IoT) system that can involve a first process for intaking new data and conducting one of dispatching the new data or queuing the new data; a second process executed at lower priority than the first process involving determining if queued data exceeds a retry count; forwarding the queued data to a third process if the retry count does not exceed the threshold; and popping the queued data into an error process if the queued data exceeds the retry count; and the third process executed after receiving the queued data from the second process, involving attempting to dispatch the queued data.

17 Claims, 10 Drawing Sheets

(56) References Cited

OTHER PUBLICATIONS

Yerpude et al. "Impact of internet of things (IoT) data on demand forecasting." In: Indian Journal of Science and Technology. Apr. 2017 (May 2017) Retrieved on Sep. 20, 2019 (Sep. 20, 2019) from <https://www.researchgate.neVprofile/Samir_Yerpude/publication/317078412_1 mpact _of_ Intern et_ of_ Things_Io T _Data_on_ Demand_Forecasting/links/5929518c0f7 e9b9979a5d6a5/I mpact-of-Internet-of-Things-IoT-Data-on-Demand-Forecasting.pdf>, 10 total pages.

| Sensor Type | Data Size | Retry count | Batch |
|---|---|---|---|
| TYPE1 | SIZE1 | RET1 | NO |
| TYPE2 | SIZE2 | RET2 | YES |
| ... | ... | ... | ... |

FIG. 5(a)

| Data Message ID | Source | Destination | Data size | Sensor Type | Retry Count |
|---|---|---|---|---|---|
| ID1 | SOU1 | DES1 | SIZ1 | SEN1 | COU1 |
| ID2 | SOU2 | DES2 | SIZ2 | SEN2 | COU2 |
| ... | ... | ... | ... | ... | ... |

SYSTEMS AND METHODS FOR COLLECTING AND SENDING REAL-TIME DATA

BACKGROUND

Field

The present disclosure is generally directed to Internet of Things (IoT) systems, and more specifically, to facilitating store and forward for data streams in IoT systems.

Related Art

There are two factors that affect IoT systems when collecting real-time sensor data and sending such data to corresponding destinations. One factor is to ensure that there is no loss of data at the destination. Another factor is to keep the data flow path as smooth as possible.

In IoT systems, the sensor data may be streamed in real time to a processing system, such as an edge node, that needs to forward such data to the appropriate destination, such as a cloud system, an analytics system, an underlying client device, and so on depending on the desired implementation. However, due to bandwidth limitations and the volume of sensor data to be routed and transmitted correctly, ensuring the above two factors can be difficult if large amounts of data are received within the same time frame and need to be processed quickly by the processing system, especially if the data flow path is to be maintained in real-time or if the data is overly large and requires intensive computational resources to dispatch.

SUMMARY

Example implementations described herein are directed to systems and methods to facilitate store and forward at an edge system or other processing system to facilitate data transmission in IoT systems. In example implementations described herein, received data is stored at a local database when the data flow path is congested, when the destination is unavailable, or in other circumstances in which the data cannot be dispatched immediately. Example implementations then gradually thread the stored data back into a main data flow to be dispatched to its intended destination through utilizing a store and forward process to avoid affecting the real-time data flow path.

As will be described herein, example implementations described herein involve a system that manages a dispatch of data within an Internet of Things (IoT) system that can involve a first process for intaking new data and conducting one of dispatching the new data or queuing the new data. Through such a process, data is queued if not dispatched (e.g., dispatched failed for some reason), which allows the example implementations to pull out non-dispatched data from the data stream so that it does not block the destination pipeline from dispatching data that can be dispatched, while allowing the system chances to retry dispatching the non-dispatched data to avoid losing data at the destination.

Example implementations also involve a second process executed at lower priority than the first process involving determining if queued data exceeds a retry count; and forwarding the queued data to a third process if the retry count does not exceed the threshold. As such, data can be requeued automatically with the updated retry count and timestamp as will be described herein.

Example implementations further involve and popping the queued data into an error process if the queued data exceeds the retry count. The third process can also be executed after receiving the queued data from the second process, and involves attempting to dispatch the queued data. Through such an example implementation, queued non-dispatched data can be folded back into the mainstream of the data transmission. Such example implementations contrast with related art implementations that involve blocking the path for new data, sending the queued data, then unblocking. Instead, the example implementations described herein involve processes that add the data to the mainstream in a gradual threading process that facilitates providing the non-dispatched data through the pipeline normally without disrupting the flow of incoming data. In example implementations, once such non-dispatched data is successfully dispatched to its original intended destination, the data can be deleted from the queue.

Aspects of the present disclosure can include a method, which can involve a first process involving intaking new data; and conducting one of dispatching the new data or queuing the new data; a second process executed at lower priority than the first process, the second process involving determining if queued data exceeds a retry count; forwarding the queued data to a third process if the retry count does not exceed the threshold; and popping the queued data into an error process if the queued data exceeds the retry count; and the third process executed after receiving the queued data from the second process, the third process involving attempting to dispatch the queued data.

Aspects of the present disclosure can include a computer program, which can involve instructions for a first process involving intaking new data; and conducting one of dispatching the new data or queuing the new data; instructions for a second process executed at lower priority than the first process, the second process involving determining if queued data exceeds a retry count; forwarding the queued data to a third process if the retry count does not exceed the threshold; and popping the queued data into an error process if the queued data exceeds the retry count; and instructions tier the third process executed after receiving the queued data from the second process, the third process involving attempting to dispatch the queued data. The instructions can be stored on a non-transitory computer readable medium and be configured to be executed by one or more processors.

Aspects of the present disclosure can include a system, which can involve means for executing a first process involving intaking new data; and conducting one of dispatching the new data or queuing the new data; means for executing a second process executed at lower priority than the first process, the second process involving determining if queued data exceeds a retry count; forwarding the queued data to a third process if the retry count does not exceed the threshold; and popping the queued data into an error process if the queued data exceeds the retry count; and means for executing the third process executed after receiving the queued data from the second process, the third process involving attempting to dispatch the queued data.

Aspects of the present disclosure can include an apparatus, which can involve a processor configured to execute a first process involving intaking new data; and conducting one of dispatching the new data or queuing the new data; a second process executed at lower priority than the first process, the second process involving determining if queued data exceeds a retry count; forwarding the queued data to a third process if the retry count does not exceed the threshold; and popping the queued data into an error process if the queued data exceeds the retry count; and the third process executed after receiving the queued data from the second process, the third process involving attempting to dispatch the queued data.

Through example implementations described herein, older data can be reincorporated back into the IoT system data stream even after it has failed to dispatch to the intended destination, while avoiding disruption and minimizing effects on the real-time data stream path.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to facilitating a store and forward edge/cloud process for an IoT system that involves large amounts of data being streamed in real time to multiple output locations. In such IoT systems, there is often a requirement in which data cannot be lost and needs to be dispatched to the output destination if possible. In such an IoT system, it is possible for the dispatch of data to be prevented from reaching its destination, either due to network connectivity issues, the destination being down, the received data being malformed, and so on. However, when some of the received data cannot be dispatched, the system may still receive live streams of data, so the dispatch of such data should not be stopped due to the failure in dispatching some of the data.

In example implementations, the data messages received by the system are associated with a timestamp to facilitate a priority system. In example implementations, when there is an intake of new data messages, the data message is assigned a priority based on the time it enters the system, so that the single data message is not retried for dispatch repeatedly. Thus, there is a delay after a data message is retried, so that the system can gradually recover whatever is going and allow data to be successfully sent through.

Figure 1:
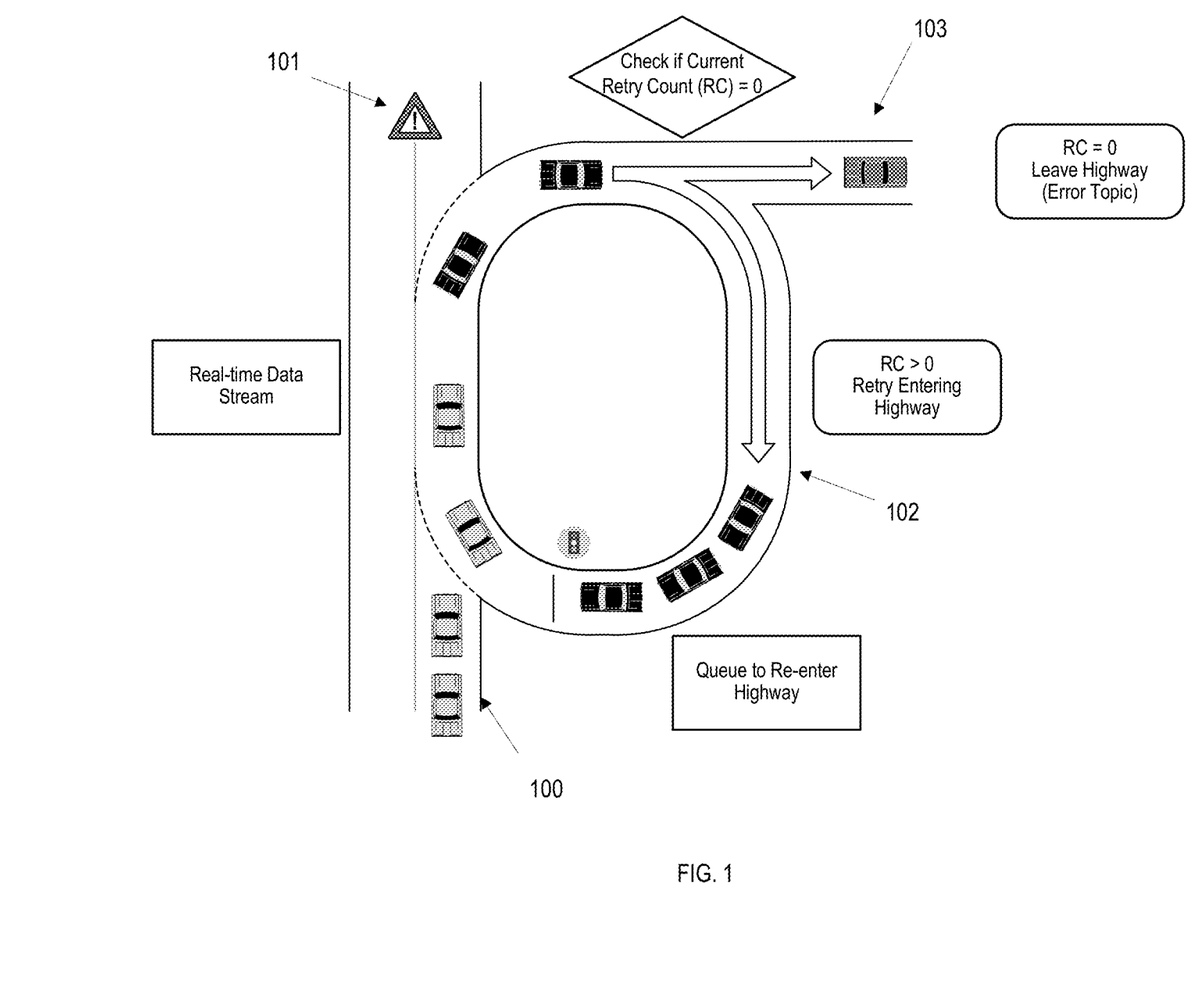
FIG. 1 illustrates an example visualization of the store and forward process for data, in accordance with an example implementation.

FIG. 1 illustrates an example visualization of the store and forward process for data, in accordance with an example implementation. In FIG. 1, the data stream and processes are illustrated as a highway with vehicles for ease of explanation, which each vehicle representing a data (e.g., packet, file, messages, etc.) to be transmitted.

In IoT systems, the processing system or edge system receives a real time data stream 100. Example implementations of the store and forward data process can be implemented in edge systems or processing systems that are configured to dispatch data to various destinations. Such edge systems or processing systems are configured to collect data that fails to reach its intended destination. The main real-time flow path to the destination may continuously receive data flow, regardless if the data path is congested or smooth due to the real-timeness of IoT systems. Accordingly, the store and forward data process of the example implementations described herein are configured to return the collected data to the main flow to reach its intended destination smoothly without affecting the real-time data flow. In the example implementations, the data flow behaves like a highway metering gate to allow the local traffic (stored data) back to the primary highway traffic (main real-time data flow). With this, the example implementation process eliminates data loss internally due to disconnections between source and destination within the allowed threshold of the retry count, and the effect on the leading real-time data flow is thereby minimized.

In example implementations as described herein, the store and forward process utilizes the following management information to manage data being stored in a queue.

The retry count indicates the number of times the particular queued data should be re-dispatched into the real-time data stream from the queue before it is taken off and sent to a configured error destination for error process handling. The retry count is decremented each time the data point is retried to keep track of when the data is to expire and be handled by error processing.

The retry rate is the amount of time to wait between each dispatch from the queue back into the real-time data stream, which conceptually functions similarly to the highway metering green light interval.

The batch count indicates the maximum number of data messages to dispatch from the queue on each retry attempt, which conceptually functions similarly to the number of cars per green light at the highway metering gate.

The attempted timestamp is a timestamp that is updated each retry attempt of the queued data within the queue. This field allows for the system to sort priority based on the time received within the system. When a new data is received, the attempted timestamp field is set to the current time.

As illustrated in FIG. 1, the store and forward process is conceptually similar to that of a highway system in that the process handles data similarly to how the highways handle cars trying to merge into traffic. Incoming real-time data can be visualized as the two cars on the main highway entering the system. This steam, if not blocked, will continuously dispatch data to its intended destination as it makes its way through the system. When the data point fails to dispatch or reach its intended destination at 101, the data is forwarded to the store and forward process which will queue the data and retry the dispatch later through the same real-time data stream.

As shown at 102, such data is queued for an attempt to re-enter the real time data stream. If the data point has not expired, the data is requeued within the store and forward process to renter the real-time stream and attempt to reach its intended destination.

At 103, if the retry count reaches zero, then the data leaves the highway due to expiration from the queue. Each data point contains a retry count which dictates when a data point is expired. When the retry count reaches zero, it is taken off of the queue and is dispatched to a configured error destination, such as an error queue or an error handling process set according to the desired implementation. The retry count acts as a threshold gate to allow a user to manipulate how long a data point can be stored in the queue before it is kicked out. Depending on the retry count as set according to the desired implementation, the size of the queue will be adjusted and allocated accordingly.

When handling queued messages and dispatching to the real-time data stream, there can be two settings that can be utilized in accordance with the desired implementation, which can be single data forwarding and batch data forwarding.

Figure 2:
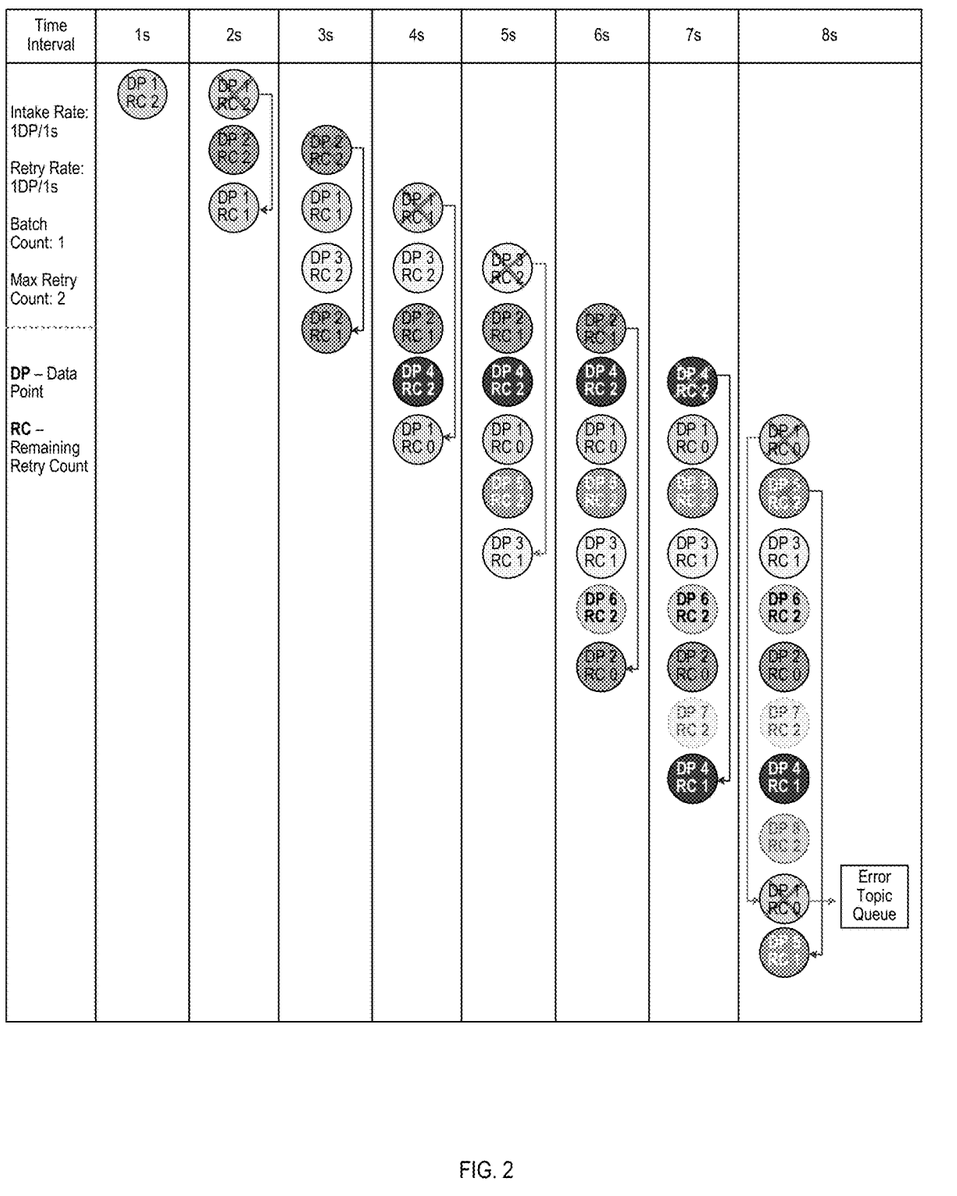
FIG. 2 illustrates an example of single data forwarding, in accordance with an example implementation.

FIG. 2 illustrates an example of single data forwarding, in accordance with an example implementation. When set for single data forwarding, the store and forward process dispatches a message from its queue one at a time. In the example illustrated in FIG. 2, DP stands for Data Point and is used to highlight each data point as it is received or queued; RC stands for Remaining Retry Count and is used to represent the retry count of the current DP as it counts down to 0. The intake rate is the current rate in which new data is being received to be queued and dispatched via the store and forward process. As illustrated in FIG. 2, the following settings are configured for the store and forward process:

Intake Rate—1 DP/sec
Retry Rate—1 DP/sec
Retry Count—2
Batch Count—1

As the time interval steps from 1 second (s)-2 s-3 s- . . . -ns, the visualization of the queue illustrates how incoming data is added to the queue, and how retried data is moved to lower priority within the queue. At each time interval, the system retrieves the current queue, as ordered by the attempted timestamp field ascending and selects the first DP to be retried. On each retry attempt of a DP, the store and forward process decrements the RC and transfers the DP to the bottom of the queue by updating the attempted timestamp field with the current time, to allow previously stored DPs to be retried at a higher priority. Each time the DP is taken off the queue, the system checks the RC value, and if it is equal to zero (i.e., no more remaining retry attempts and is expired), the data is dispatch to an error handling location (e.g., an error topic queue). Afterward, the next value at the top of the queue is immediately retried and follows the same process. If the DP has a valid RC, an alert is sent to the system, to notify the service to retry dispatching that DP to its intended destination. When queuing new data within the buffer facilitating the queue, the queued data is appended to the bottom of the stack with the lowest priority of the current system by setting the attempted timestamp to the current time.

Figure 3:
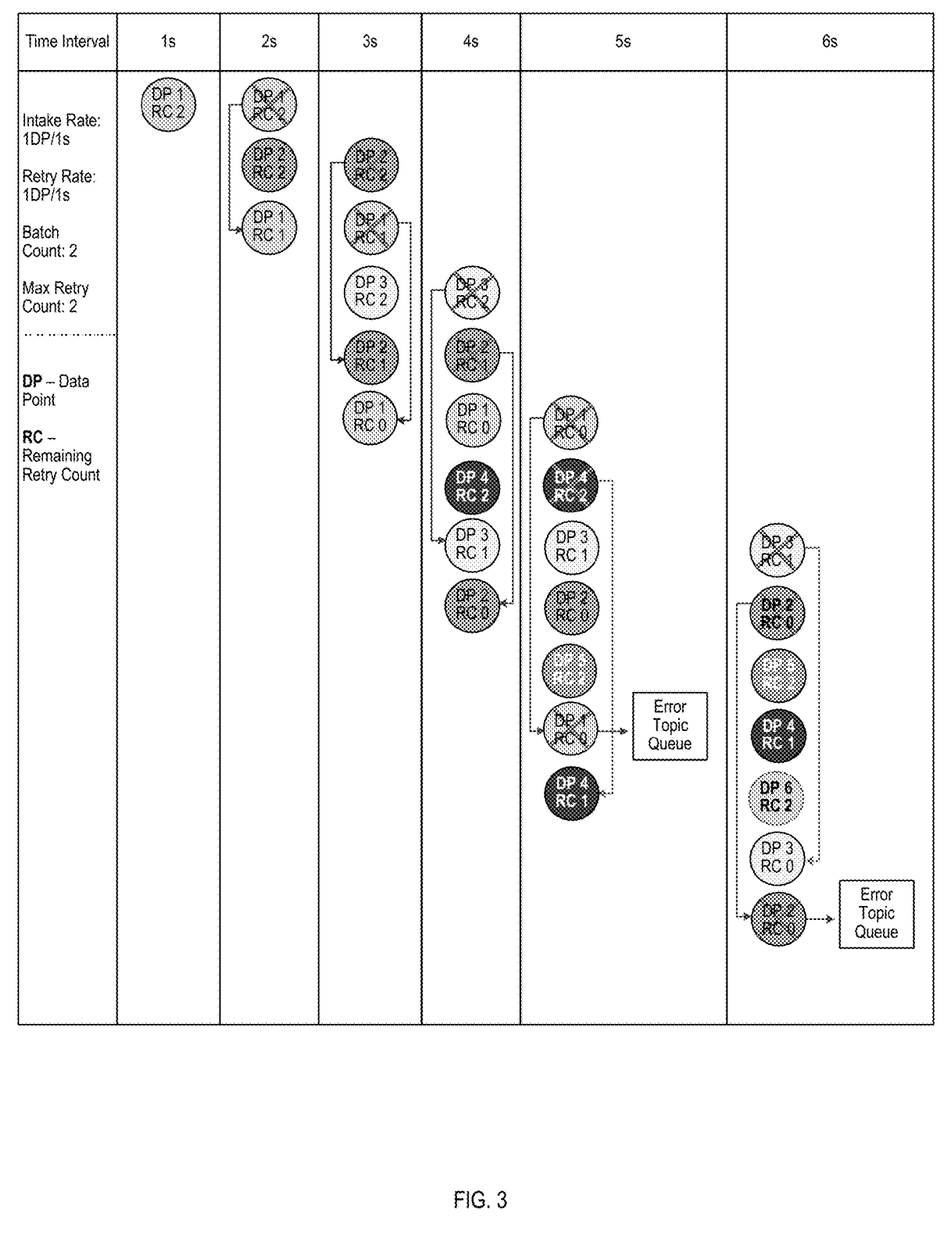
FIG. 3 illustrates an example of batch data forwarding, in accordance with an example implementation.

FIG. 3 illustrates an example of batch data forwarding, in accordance with an example implementation. When set for batch data forwarding, the store and forward process dispatches a maximum of n number of messages at one time. In FIG. 3, DP stands for Data Point and is used to highlight each data point as it is received or queued; RC stands for Remaining Retry Count and is used to represent the retry count of the current DP as it counts down to 0. The intake rate is the current rate in which new data is being received to be queued and dispatched via the store and forward process. As illustrated in FIG. 3, the following settings are configured for the store and forward process:

Intake Rate—1 DP/sec
Retry Rate—1 DP/sec
Retry Count—2
Batch Count—2

As the time interval steps from 1 second (s)-2 s-3s- . . . -ns, the visualization of the queue illustrates how incoming data is added to the queue, and how retried data is moved to lower priority within the queue. For each time interval, the system retrieves the current queue, ordered by the attempted timestamp field in ascending order, and selects the top set of the batch count number of DPs to be retried. On the retry of each set of DPs, the RC is decremented for each data point, and the DPs are transferred to the bottom of the queue by updating the attempted timestamp field with the current time, to allow previously stored DPs to be retried at a higher priority. Each time the set of DPs are taken off the queue, the system checks each RC value, and if it any are equal to zero (i.e., no more remaining retry attempts and have expired) those specific DPs are dispatched to an error handling location (which for our case is an error topic queue). Afterward, if there are remaining DPs having a valid RC, an alert is sent to the system to notify the service to retry the dispatching of those DPs to their intended destination. If there are no remaining DPs, the next batch at the top of the queue is immediately retried with the same process. When queuing new data within the store and forward process, it is appended to the bottom of the stack with the lowest priority of the current system by setting the attempted timestamp to the current time.

Figure 4A:
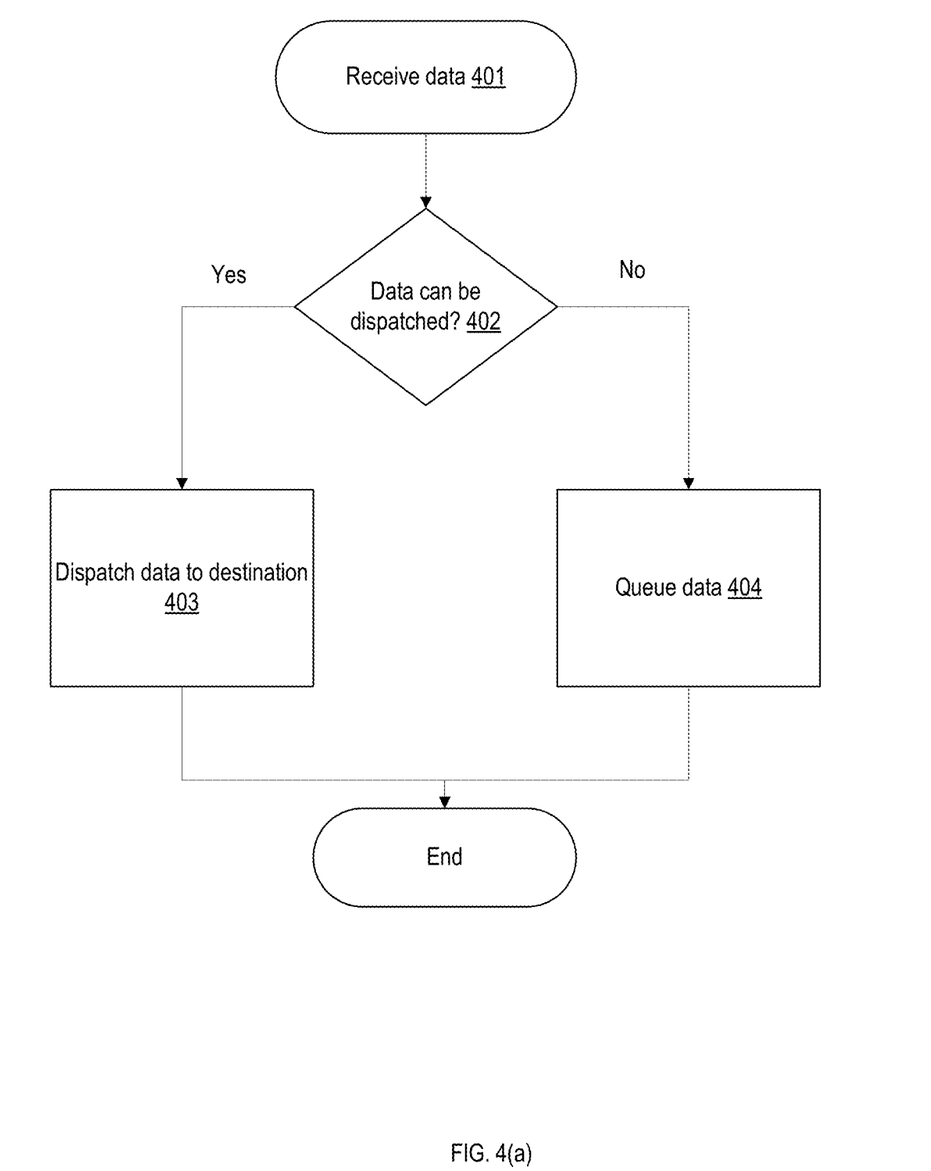
FIGS. 4(a) to 4(c) illustrate example flow diagrams in accordance with an example implementation.
Figure 4B:
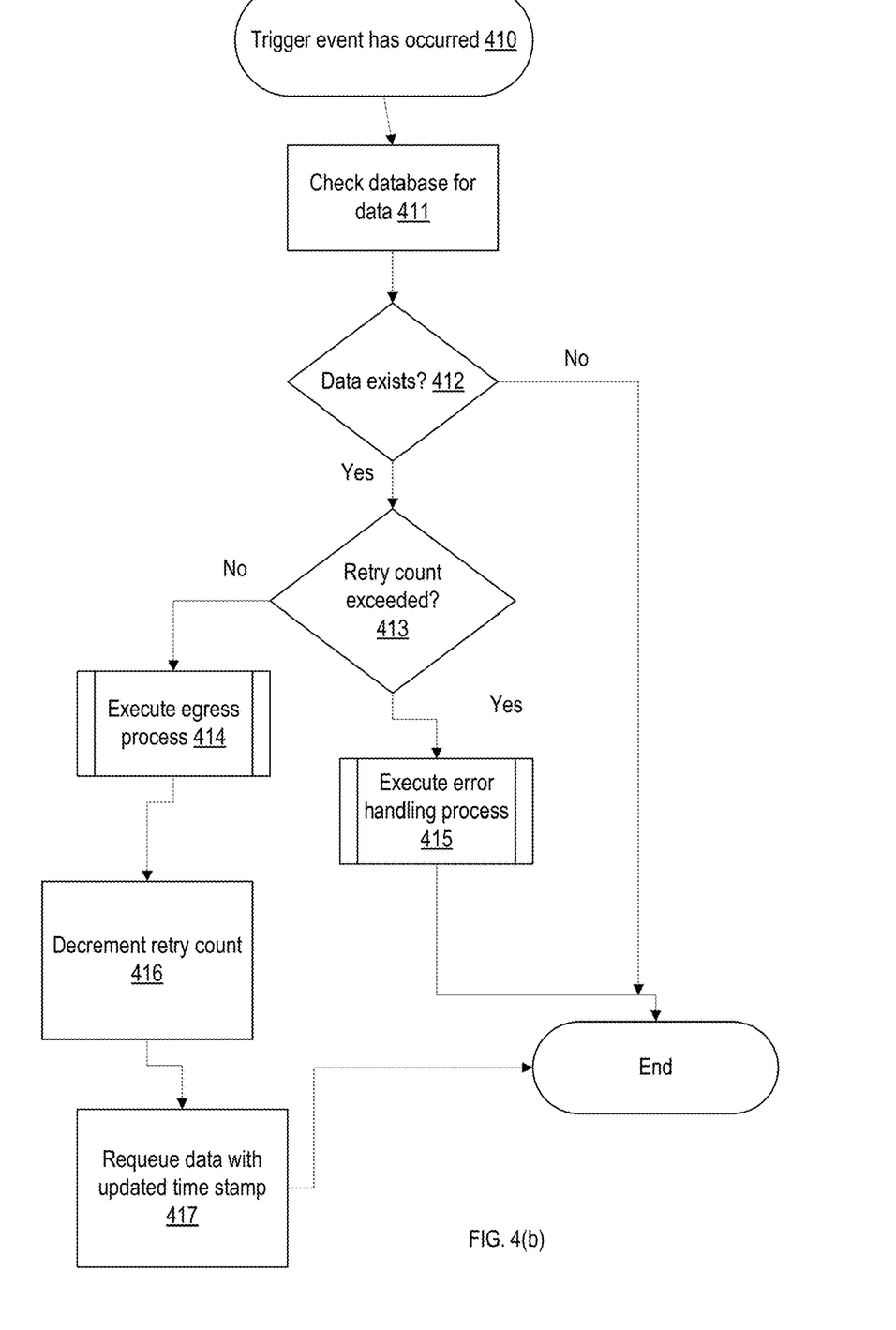
Figure 4C:
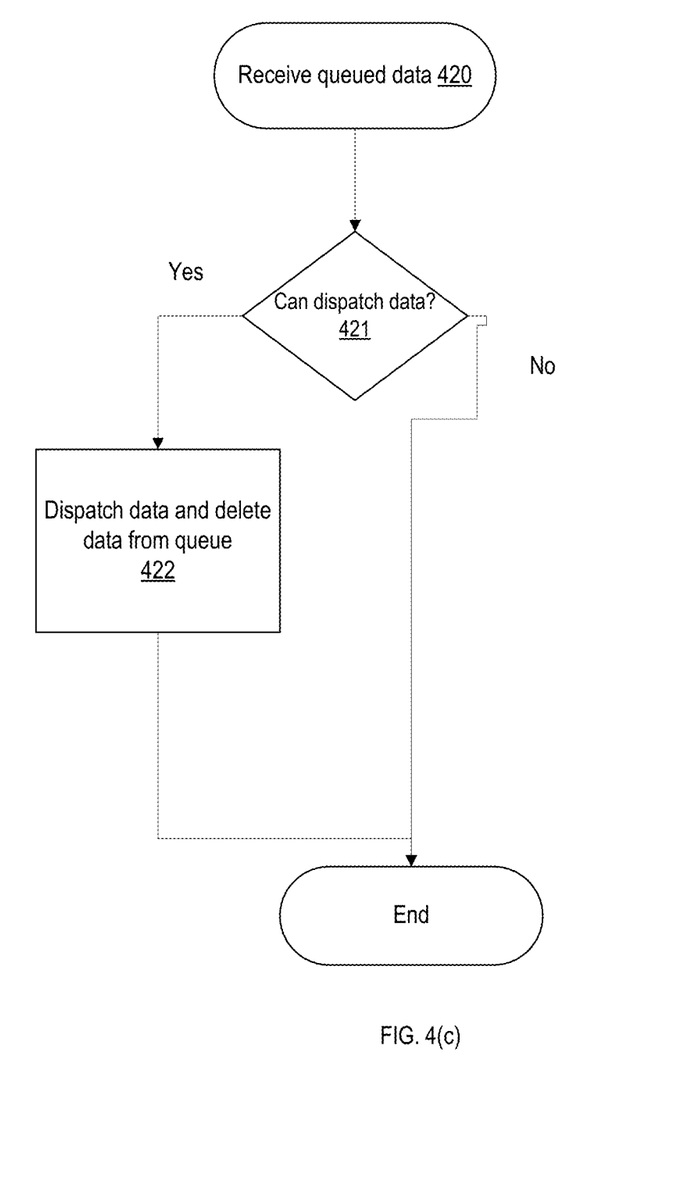

FIGS. 4(*a*) and 4(*c*) illustrate example flow diagrams in accordance with an example implementation. Specifically, FIG. 4(*a*) illustrates a first process for managing the intaking of new data, which is executed when data is received at 401. At 402, the first process intakes the new data to determine whether the data can be dispatched to the destination. If so (Yes), the flow proceeds to 403 to dispatch the data to the corresponding destination, otherwise (No) the flow proceeds to 404 to queue the data in a database or temporary storage, in accordance with the desired implementation. Further, the flow at 404 can also involve having the first process trigger the second process for facilitating store and forward functionality depending on the desired implementation.

FIG. 4(*b*) illustrates a second process for facilitating store and forward functionality, in accordance with an example implementation. In example implementations, the store and forward process is executed when a trigger event has occurred at 410. Such a trigger event can include when a period of time has elapsed, when the first process invokes the second process to guarantee a retry rate, when the error handling process is executed, and so on in accordance with the desired implementation. In example implementations in which the first process and second process are threaded processes, the second process is invoked at a lower priority than the first process to ensure that the intake of new data is prioritized over execution of the store and forward process.

At 411, the second process checks the database for data to determine if there is queued data remaining. At 412 a determination is made as to whether such queued data exists. If Not (No), then the second process ends, otherwise (Yes), the flow proceeds to 413. At 413, a determination is made as to whether the retry count associated with the queued data has not been exceeded (e.g., the data has not been expired). In example implementations as described above, the retry count is implemented in the form of decrementing the retry count each time the queued data fails to complete dispatching, in which case the retry count is determined to be exceeded when the count falls to zero. However, one of ordinary skill in the art can also change such implementations to increment the retry count each time the queued data fails to complete dispatching, in which case the retry count is determined to be exceeded when the count reaches a certain threshold. Any such implementation can be utilized in accordance with the desired implementation. If the retry count is exceeded (Yes), the flow proceeds to 415 to execute an error handling process by popping the queued data out of the database and into the error process, thereby removing the queued data from the database. Such an error process can be in the form of a thread process configured to delete the popped data and transmit a message back to the source of the popped data to indicate that the transmission of the data has failed, or otherwise in accordance with the desired implementation. Depending on the desired implementation, the execution of the error handling process at 415 can also function as a trigger for 410 to re-execute the second process, as no queued data was dispatched in the original iteration due to the retry count being exceeded. In this manner, the second process can be reexecuted to act on the next queued data after the error handling process 415 is executed to ensure that the second process is constantly reiterated until at least some queued data that has not exceeded the retry count can be processed at least once.

If the retry count is not exceeded (No), then the flow proceeds to 414 to execute a third process as illustrated in FIG. 4(c) which is the egress process for the queued data. At 416, the flow proceeds to 416 to decrement the retry count associated with the queued data, and then requeues the data with an updated timestamp at 417.

FIG. 4(c) illustrates an example of a third process to facilitate the egress process 414, in accordance with an example implementation. The third process 414 is triggered at 420 when queued data is received. At 421, the third process attempts to dispatch the data through the real time data stream. If the dispatch succeeds (Yes), then the queued data is dispatched from the system at 422, whereupon the third process deletes the data from the queue. In example implementations, the processes of FIGS. 4(a) to 4(c) can be executed as threads, so that the flow of the second process at 416 and 417 may be executed by the second process concurrently while the third process is attempting to dispatch the data. Accordingly, the third process is configured to handle the deletion of the data from the queue once it is successfully dispatched to account for the data being requeued by the second process even though it has dispatched.

Figure 5A:
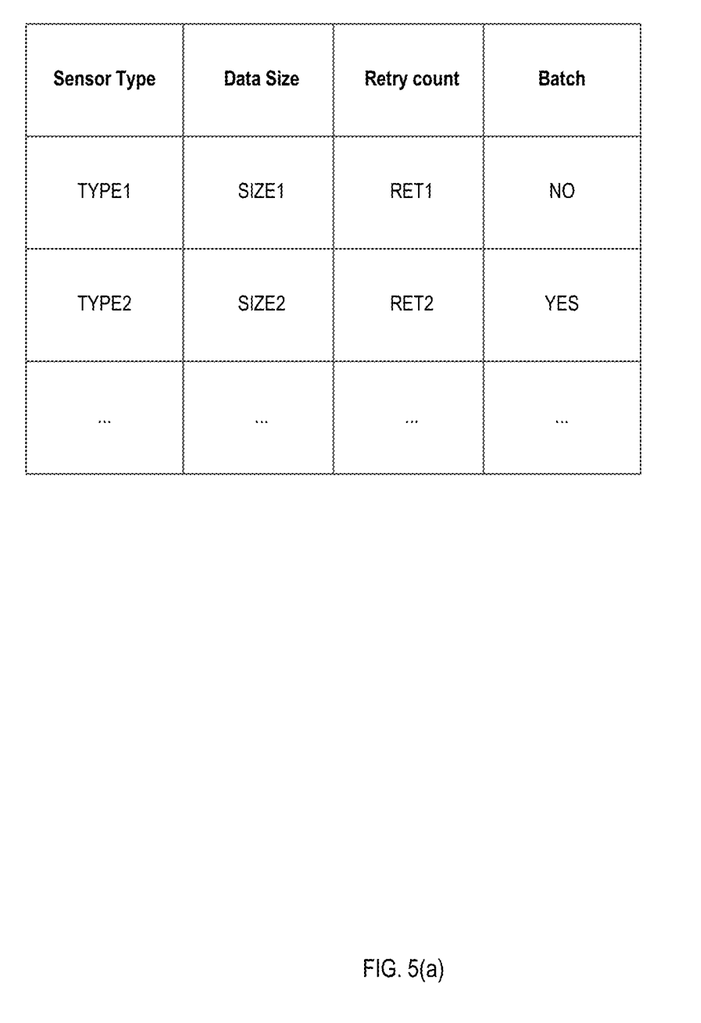
FIGS. 5(a) and 5(b) illustrate examples of management information that can be utilized to facilitate the example implementations described herein.

FIGS. 5(a) and 5(b) illustrate examples of management information that can be utilized to facilitate the example implementations described herein. Specifically, FIG. 5(a) illustrates example management information for the system to manage different types of sensors, in accordance with an example implementation. In example implementations herein, the IoT system may manage different types of sensors which can be associated with different sizes of data and so on. As shown in FIG. 5(a), the management information can include sensor type, data size, retry count, batch flag, and guaranteed rate. Sensor type indicates the type of sensor associated with the received data. The sensor type can be determined based on the source sensor array, by the size of the data, or otherwise in accordance with the desired implementation. Data size is indicative of the size of the data messages associated with the sensor type. Retry count indicates the retry count that is set tier data messages for the sensor type. The retry count can be set according to the data size to facilitate the desired implementation (e.g., larger retry count for smaller data, smaller retry count for larger data, etc.). Batch count flag can indicate if the type of sensor data can be transmitted as a batch or not.

In example implementations, based on the management information of FIG. 5(a) and the type of sensor data that is stored in the queue, the first, second and third processes of the system can configure settings to facilitate the handling of such queued data accordingly. For example, if the queued data is all associated with sensor types in which batch dispatching is enabled (YES), then the processes can be configured to dispatch messages in a batch count (e.g., attempting to dispatch data messages in batch until a size such as 50 MB is dispatched). The guaranteed rate can be set based on the size of data (e.g., rate is set at x number of tries per second based on the size of the data being transmitted, wherein smaller data can be retried more often than larger data).

Figure 5B:
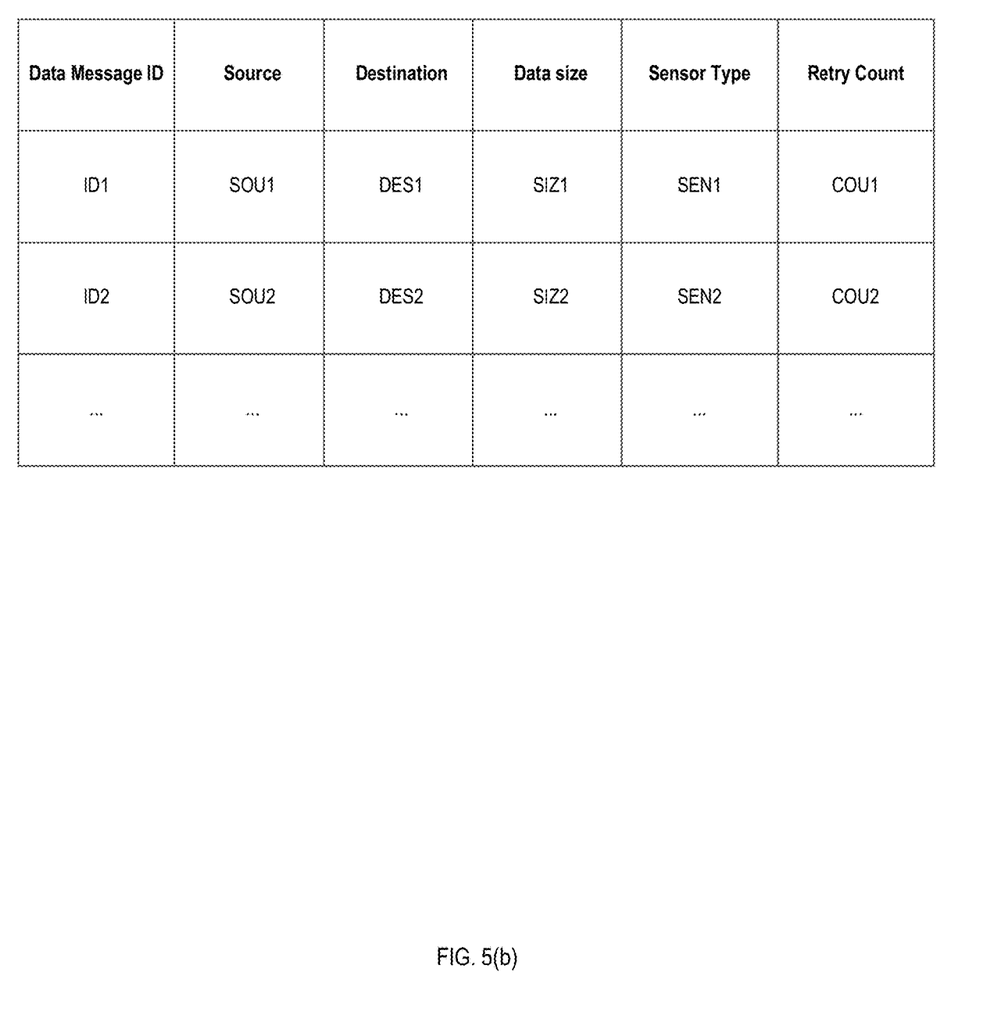

FIG. 5(b) illustrates example management information for the data stored in the database queue, in accordance with an example implementation. The data can be associated with metadata that indicates the data message ID, the source, the destination, the data size, the sensor type, and the retry count. Data message ID is an identifier that is associated with the data when it is intake into the system. Depending on the desired implementation, the data message ID can be the timestamp that is provided by the system when the data intake occurs. In this manner, the data message ID can be updated with new timestamps each time the data message is requeued into the database. Source indicates the source of the data message and can be in any form in accordance with the desired implementation (e.g., IP address, sensor ID, etc.). When the system requires error processing on the data, a data message can be transmitted to the source to indicate that the message failed to dispatch to the destination. Destination can indicate the output destination of the data message and can be in any form in accordance with the desired implementation (e.g., IP address, etc.). Data size can indicate the size of the data message. Sensor type can indicate the type of sensor data that was received. Retry count is the retry count associated with the data message.

Figure 6:
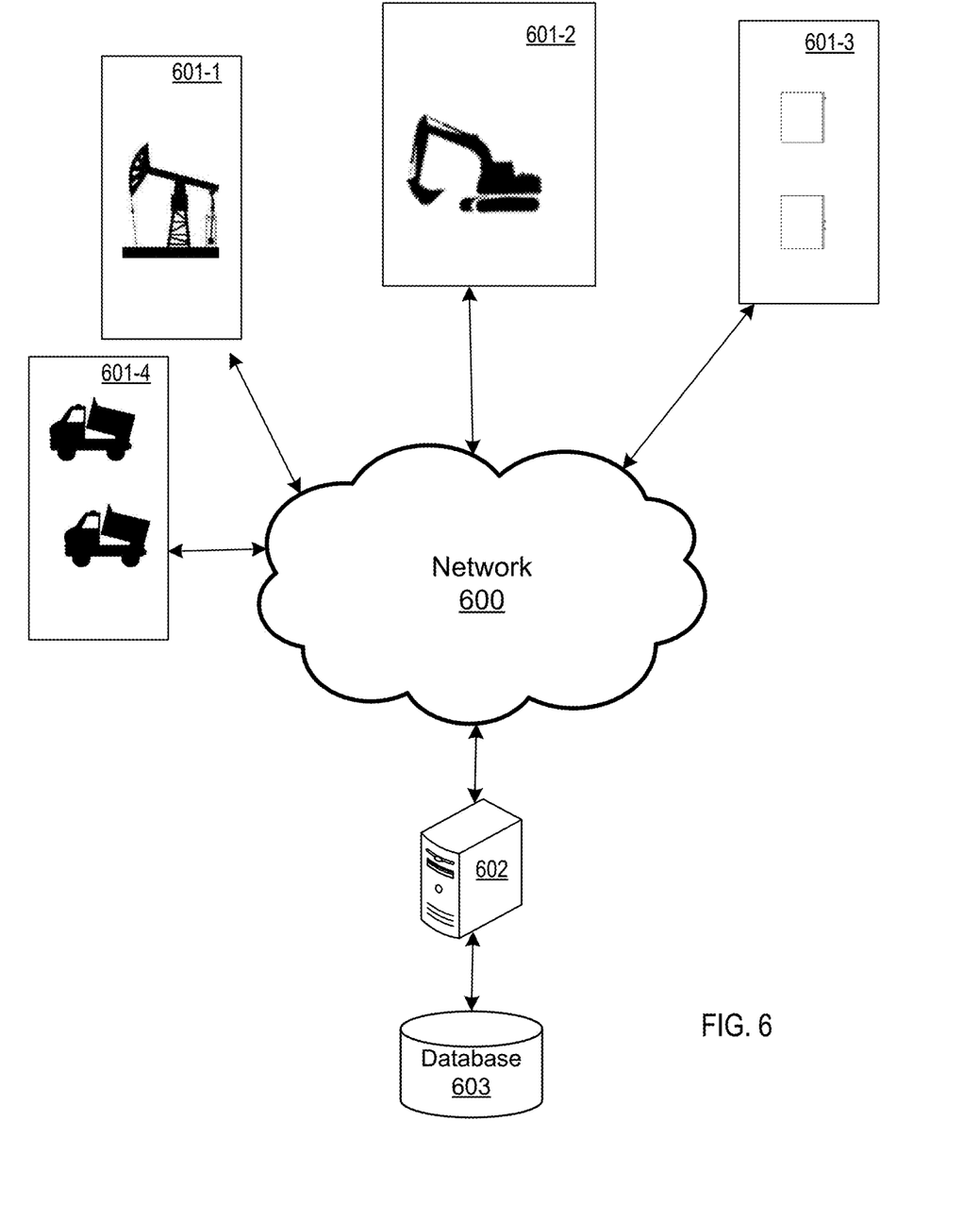
FIG. 6 illustrates a system involving a plurality of apparatuses and an edge/cloud processing apparatus, in accordance with an example implementation.

FIG. 6 illustrates a system involving a plurality of apparatuses and an edge/cloud processing apparatus, in accordance with an example implementation. One or more apparatuses or apparatus systems 601-1, 601-2, 601-3, and 601-4 are communicatively coupled to a network 600 and stream sensor data to an edge/cloud processing apparatus 602 configured to receive such data and transmit the data to its corresponding destination. The edge/cloud processing apparatus 602 manages a database 603, which manages queued data to be dispatched. Such apparatuses or apparatus systems can include stationary apparatuses or equipment such as coolers, air conditioners, servers, as well as mobile apparatuses or equipment such as automobiles, trucks, cranes, as well as any other apparatuses that may transmit live streaming data. Such apparatuses can involve sensors to provide sensor data to the maintenance planning apparatus 602.

Figure 7:
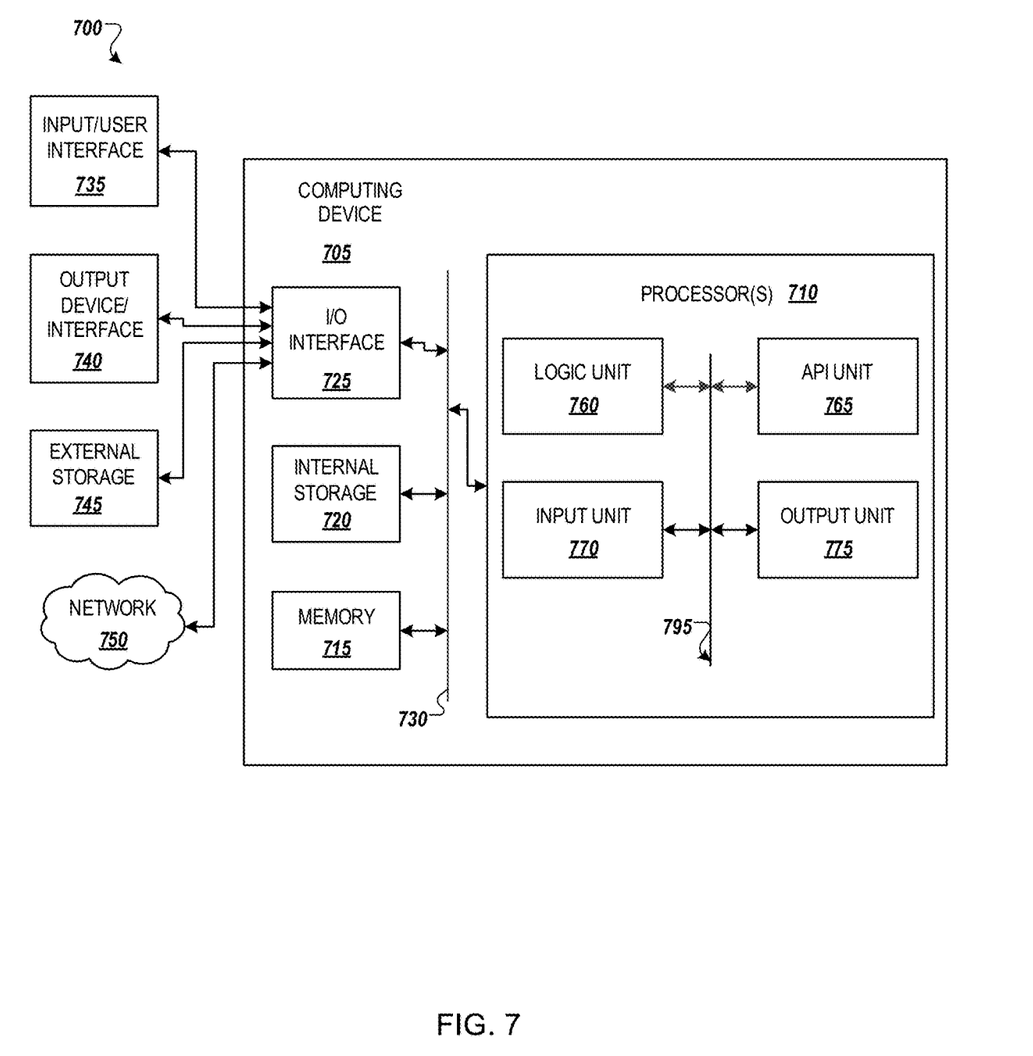
FIG. 7 illustrates an example computing environment with an example computer device suitable for use in some example implementations.

FIG. 7 illustrates an example computing environment with an example computer device suitable for use in some example implementations, such as an edge/cloud processing apparatus 602 as illustrated in FIG. 6. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Memory 715 can be configured to store management information as shown in FIG. 5(a) and FIG. 5(b) to facilitate the example implementations. Database 602 can be facilitated by some combination of memory 715 and/or internal storage 720 as well as external storage 745 in the form of a storage system to facilitate the example implementations according to the desired implementation.

Processor(s) 710 can be configured to execute a first process as illustrated in FIG. 4(a) involving intaking new data; and conducting one of dispatching the new data or queuing the new data; a second process executed at lower priority than the first process as illustrated in FIG. 4(b) involving determining if queued data exceeds a retry count; forwarding the queued data to a third process if the retry count does not exceed the threshold; and popping the queued data into an error process if the queued data exceeds the retry count; and the third process executed after receiving the queued data from the second process as illustrated in FIG. 4(c), the third process involving attempting to dispatch the queued data. In example implementations in which the first process, second process, and third process are executed as threads, the second process can be invoked periodically at a lower priority than the first process (e.g., first process executes continuously in real time, second process is executed every 2-3 seconds) to prioritize incoming new data to queued data when data is being dispatched.

In an example implementation, the second process further can involve requeuing the queued data after forwarding the queued data to the third process as shown at 417, wherein the third process is responsible for deleting the requeued data and the entry from the management information of FIG. 5(*b*) if the third process successfully dispatches the data. In this manner, the second and third process can be executed concurrently. In an example implementation, the requeuing of the queued data after forwarding the queued data to the third process can involve decrementing the retry count for the queued data 416; and requeuing the queued data with the updated time stamp and the decremented retry count at 417. In this manner, the management information can be updated at FIG. 5(*b*) concurrently with the attempted dispatch process from the third process of FIG. 4(*c*).

In an example implementation, processor(s) 710 can be configured to re-execute the second process on next queued data after the popping the queued data into the error process. In such an example implementation, if the second process is invoked and only the error handling process 415 is invoked from the execution of the second process, the second process can thereby be reiterated to guarantee that the egress process 414 is executed on some of the queued data when the second process is invoked.

As shown in FIG. 5(*a*), the new data can be received from one of a plurality of different types of sensors, wherein the first process, the second process, and the third process are configured to execute based on the one of the plurality of different types of sensors associated with the new data through adjusting the retry count, the size of data to be dispatched, and so on in accordance with the desired implementation. In such example implementations, data of various sizes and from various types of sensors can be processed by processor(s) 710 and do not have to be uniform to be facilitated by the store and forward process.

In example implementations, processor(s) 710 can facilitate the queuing of new data 404 by setting the retry count for the new data based on a size of the new data. The retry count can be set according to the management information as illustrated in FIG. 5(*a*) which assigns a retry count based on the size of the data (e.g., higher retry count for smaller data).

Depending on the desired implementation, the second process can be executed on a guaranteed retry rate set based on a size of the new data. For example, the second process can be executed periodically at a rate of one message per second if the size of each of the data messages in the queue does not exceed a certain size, and can be adjusted upwards or downwards in accordance with the desired implementation.

Depending on the desired implementation, the second process can be executed according to a batch count set according to the size of data. For example, the second process can be executed periodically to attempt dispatch of a set number of messages, or as many messages as possible up until a total size of data has been dispatched, which can be made larger for smaller data or smaller for larger data, or otherwise in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
 a first process comprising:
  intaking new data;
  conducting one of dispatching the new data or queuing the new data;
 a second process executed at lower priority than the first process, the second process comprising:
  determining if queued data exceeds a retry count;
  forwarding the queued data to a third process if the retry count does not exceed the threshold; and
  popping the queued data into an error process if the queued data exceeds the retry count; and
 the third process executed after receiving the queued data from the second process, the third process comprising:
  attempting to dispatch the queued data.

2. The method of claim 1, wherein the second process further comprises requeuing the queued data after forwarding the queued data to the third process.

3. The method of claim 2, wherein the requeuing the queued data after forwarding the queued data to the third process comprises:
 updating a timestamp for the queued data; and
 decrementing the retry count for the queued data; and
 requeuing the queued data with the updated time stamp and the decremented retry count.

4. The method of claim 1, further comprising:
 re-executing the second process on next queued data after the popping the queued data into the error process.

5. The method of claim 1, wherein the new data is received from one of a plurality of different types of sensors, wherein the first process, the second process, and the third process are configured to execute based on the one of the plurality of different types of sensors associated with the new data.

6. The method of claim 1, wherein the queuing the new data comprises setting the retry count for the new data based on a size of the new data.

7. The method of claim 1, wherein second process is executed on a guaranteed retry rate set based on a size of the new data.

8. The method of claim 1, wherein second process is executed according to a batch count set according to the size of data.

9. A computer program, storing instructions for executing a process, the instructions comprising:
 a first process comprising:
  intaking new data;
  conducting one of dispatching the new data or queuing the new data;
 a second process executed at lower priority than the first process, the second process comprising:
  determining if queued data exceeds a retry count;
  forwarding the queued data to a third process if the retry count does not exceed the threshold; and
  popping the queued data into an error process if the queued data exceeds the retry count; and
 the third process executed after receiving the queued data from the second process, the third process comprising:
  attempting to dispatch the queued data.

10. The computer program of claim 9, wherein the second process further comprises requeuing the queued data after forwarding the queued data to the third process.

11. The computer program of claim 10, wherein the requeuing the queued data after forwarding the queued data to the third process comprises:
 updating a timestamp for the queued data; and
 decrementing the retry count for the queued data; and
 requeuing the queued data with the updated time stamp and the decremented retry count.

12. The computer program of claim 9, further comprising:
 re-executing the second process on next queued data after the popping the queued data into the error process.

13. The computer program of claim 9, wherein the new data is received from one of a plurality of different types of sensors, wherein the first process, the second process, and the third process are configured to execute based on the one of the plurality of different types of sensors associated with the new data.

14. The computer program of claim 9, wherein the queuing the new data comprises setting the retry count for the new data based on a size of the new data.

15. The computer program of claim 9, wherein second process is executed on a guaranteed retry rate set based on a size of the new data.

16. The computer program of claim 9, wherein second process is executed according to a batch count set based on a size of the data.

17. An apparatus, comprising:
 a processor, configured to execute:
  a first process comprising:
   intaking new data;
   conducting one of dispatching the new data or queuing the new data;
  a second process executed at lower priority than the first process, the second process comprising:
   determining if queued data exceeds a retry count;
   forwarding the queued data to a third process if the retry count does not exceed the threshold; and
   popping the queued data into an error process if the queued data exceeds the retry count; and
  the third process executed after receiving the queued data from the second process, the third process comprising:
   attempting to dispatch the queued data.

* * * * *